No. 865,035. PATENTED SEPT. 3, 1907.
C. J. HARTLEY & R. H. BISHOP.
SWITCHBACK APPARATUS.
APPLICATION FILED MAY 21, 1907.

No. 865,035. PATENTED SEPT. 3, 1907.
C. J. HARTLEY & R. H. BISHOP.
SWITCHBACK APPARATUS.
APPLICATION FILED MAY 21, 1907.

No. 865,035. PATENTED SEPT. 3, 1907.
C. J. HARTLEY & R. H. BISHOP.
SWITCHBACK APPARATUS.
APPLICATION FILED MAY 21, 1907.

Witnesses:
Inventors:

No. 865,035. PATENTED SEPT. 3, 1907.
C. J. HARTLEY & R. H. BISHOP.
SWITCHBACK APPARATUS.
APPLICATION FILED MAY 21, 1907.

Witnesses:-

Inventors:-

No. 865,035. PATENTED SEPT. 3, 1907.
C. J. HARTLEY & R. H. BISHOP.
SWITCHBACK APPARATUS.
APPLICATION FILED MAY 21, 1907.

No. 865,035. PATENTED SEPT. 3, 1907.
C. J. HARTLEY & R. H. BISHOP.
SWITCHBACK APPARATUS.
APPLICATION FILED MAY 21, 1907.

No. 865,035. PATENTED SEPT. 3, 1907.
C. J. HARTLEY & R. H. BISHOP.
SWITCHBACK APPARATUS.
APPLICATION FILED MAY 21, 1907.

No. 865,035. PATENTED SEPT. 3, 1907.
C. J. HARTLEY & R. H. BISHOP.
SWITCHBACK APPARATUS.
APPLICATION FILED MAY 21, 1907.

No. 865,035. PATENTED SEPT. 3, 1907.
C. J. HARTLEY & R. H. BISHOP.
SWITCHBACK APPARATUS.
APPLICATION FILED MAY 21, 1907.

Witnesses:
Henry Thieme.
F. George Barry.

Inventor:-

UNITED STATES PATENT OFFICE.

CYRIL JOHN HARTLEY, OF STONE, AND ROBERT HODGES BISHOP, OF ISLINGTON, ENGLAND, ASSIGNORS TO "THE AVERNUS WHEEL LIMITED," OF LONDON, ENGLAND, A CORPORATION.

SWITCHBACK APPARATUS.

No. 865,035.      Specification of Letters Patent.      Patented Sept. 3, 1907.

Application filed May 21, 1907. Serial No. 374,967.

*To all whom it may concern:*

Be it known that we, CYRIL JOHN HARTLEY, engineer, and ROBERT HODGES BISHOP, gentleman, both subjects of the King of Great Britain, and residents of Drysdale House, Stone, in the county of Stafford, England, and 4 Highbury Mansions, Upper street, Islington, in the county of London, England, respectively, have invented new and useful Improvements in Switchback Apparatus, of which the following is a specification.

The present invention has reference to apparatus to be employed for the amusement or recreation of the public.

The apparatus is of the switch-back railway type but instead of having a stationary undulating track with cars running by gravity thereon, the track is mounted on a wheel which is rotated. The car rests on the track and as the wheel rotates has imparted to it up and down, pitching, rocking and similar movements together with an apparent advancing movement which does not in reality take place as the car is anchored or held against longitudinal motion by arms, rods or their equivalent.

The car or vehicle may be of any convenient form and of attractive appearance and may be provided with rollers or runners or slides.

Track wheels may be arranged side by side in pairs, each bearing a car or single form of apparatus may be used comprising only one track wheel or the car may be supported on two wheels placed in line.

In the accompanying drawings.

Figure 1:
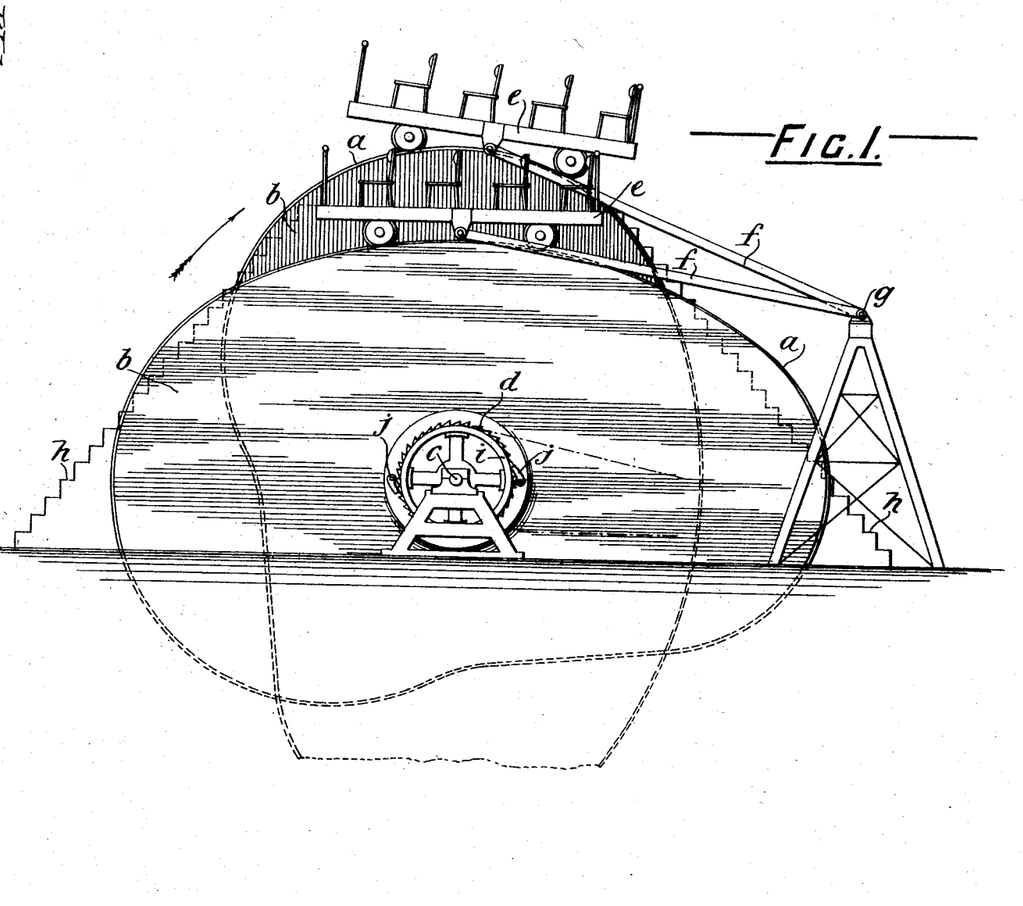
Figure 1 shows diagrammatically in side elevation a simple construction of switch-back embodying this invention.
Figure 2:
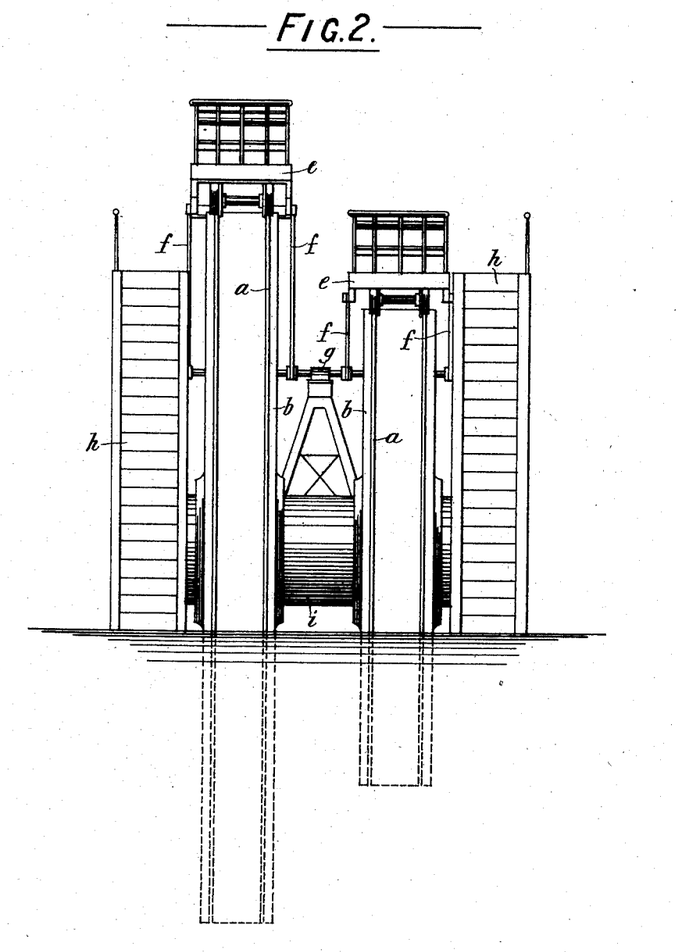
Fig. 2 is an end elevation.

Turning first to Figs. 1 and 2, $b, b$, are a pair of wheels of cam-like contour constructed about a drum $i$ which is supported by an axle $c$ by means of radial arms. The axle $c$ preferably turns free and is driven by any suitable clutch arrangement. In the drawing is indicated a pair of pawls $j, j$, carried by the drum $i$ and a ratchet wheel $d$ engaging therewith and driven by any suitable device.

The wheels $b, b$, are mounted with their longest diameters transverse to each other. Upon their peripheries are tracks $a$ and upon the tracks rest cars $e$ which are anchored by rods or bars $f$ to fixed points $g$.

When the wheels are rotated preferably in the direction of the arrow there is imparted to the cars a motion which to the occupants is similar to the motion of cars running on an ordinary switch-back or gravity railway. $h$ are stairs for giving access to the cars. The wheels are preferably mounted so as to rotate partly underground.

Figure 3:
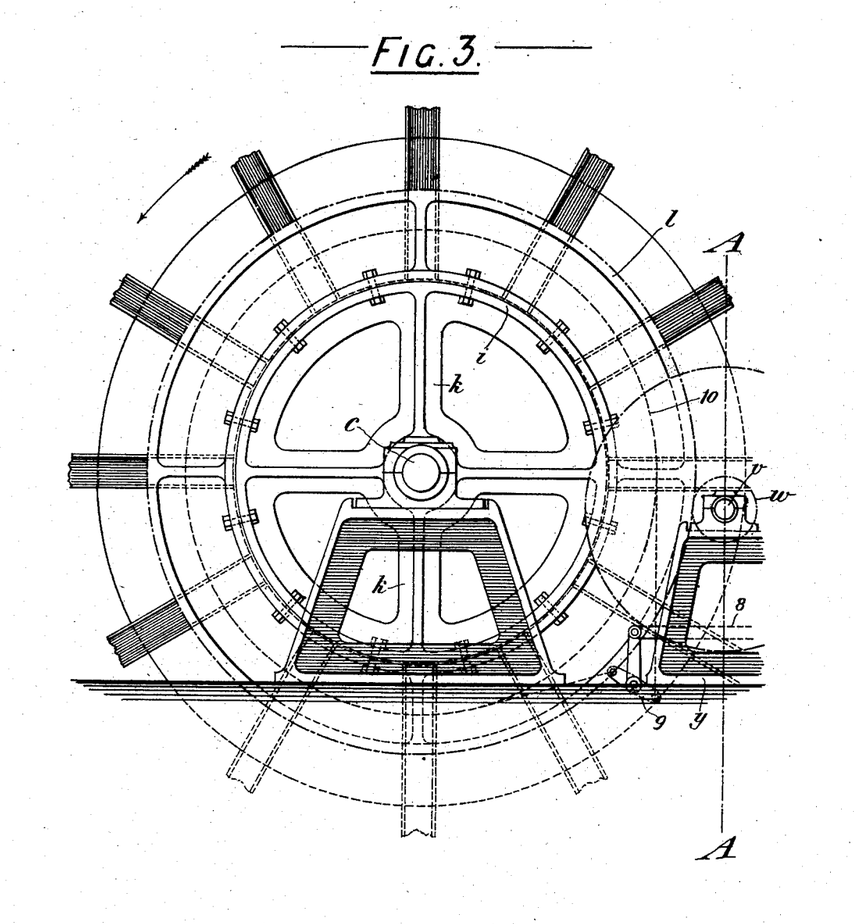
Fig. 3 shows in greater detail in side elevation a portion of the means for mounting and driving the wheel, Fig. 3ª is a similar view showing the other portion of the means for mounting and driving the wheel.
Figure 3A:
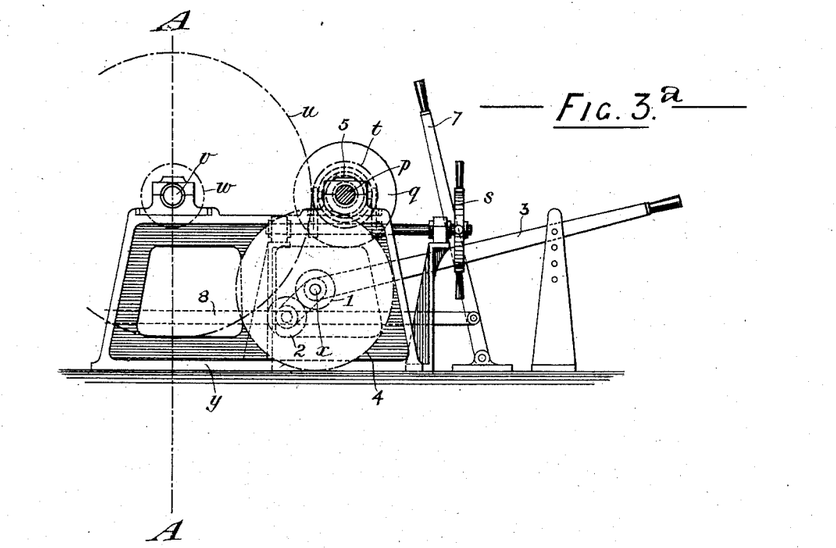
Figure 4:
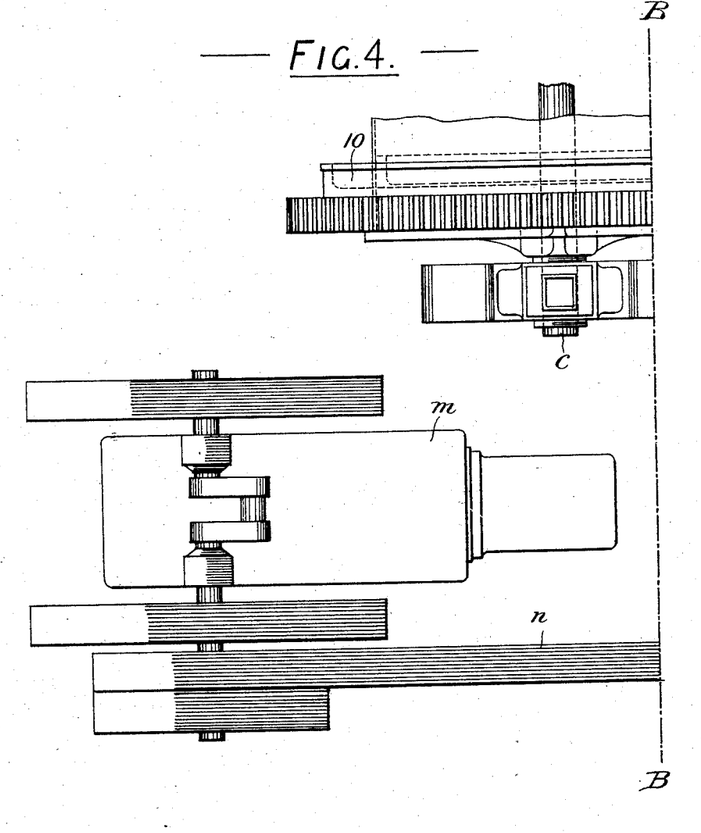
Fig. 4 is a plan view of the parts shown in Fig. 3, with an engine represented in addition, Fig. 4ª is a plan view of the parts shown in Fig. 3ª.
Figure 4A:
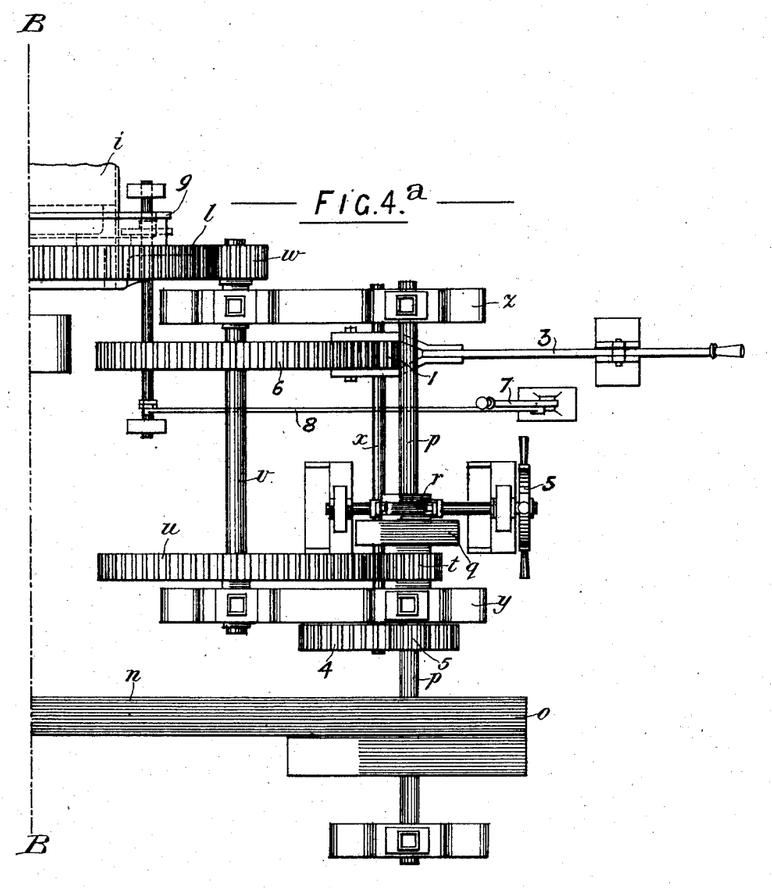

Turning to Figs. 3 and 4 which illustrate in detail a driving gear for the switch-back wheel or wheels, $i$ is the drum and $k$ are spokes radiating therefrom.

$c$ is the axle which carries the drum $i$ and the spur wheel $l$ bolted thereto.

$m$ is an engine (see Fig. 4) driving by means of a belt $n$ and pulleys $o$ a shaft $p$. This shaft $p$ carries a spur wheel $t$ which is locked thereto by means of a clutch $q, r$ carried on the same shaft. The members of the clutch $q, r$ are moved in and out of engagement by means of a hand wheel $s$. The spur wheel $t$ gears with the spur wheel $u$ keyed on the shaft $v$ which carries the spur wheel $w$ gearing with the spur wheel $l$ before mentioned. In this manner is driven the spur wheel $l$ and the parts connected therewith including the wheel or wheels $b$ when the clutch $q, r$ is in engagement and the shaft $p$ is running. Parallel with the shaft $p$ is the shaft $x$ mounted in bearings in the same brackets $y$ and $z$ as the shaft $p$ but at a lower level. On this shaft $x$ is keyed a pinion 1 in permanent engagement with a pinion 2 carried in the fork of a lever 3 fulcrumed on the shaft $x$ (see Fig. 3). The shaft $x$ carries also a spur wheel 4 which permanently gears with the spur wheel 5 keyed on the shaft $p$.

6 is a spur wheel on the shaft $v$ so arranged with regard to the spur wheels 1 and 2 that it is in a position to engage with the latter when it is raised by rocking the lever 3. This forms an alternative means for driving the pinion $w$ when it is desired to turn the wheel slowly, when required, as for instance, when the car is to be brought to the proper level for entering or leaving, the gearing of the alternative train being designed to be slower and incidentally more powerful than the train of gearing normally employed when the wheel is running for profit.

7 is a brake lever operating through a link 8 on the cross head 9 of a band brake on the drum 10.

Figure 5:
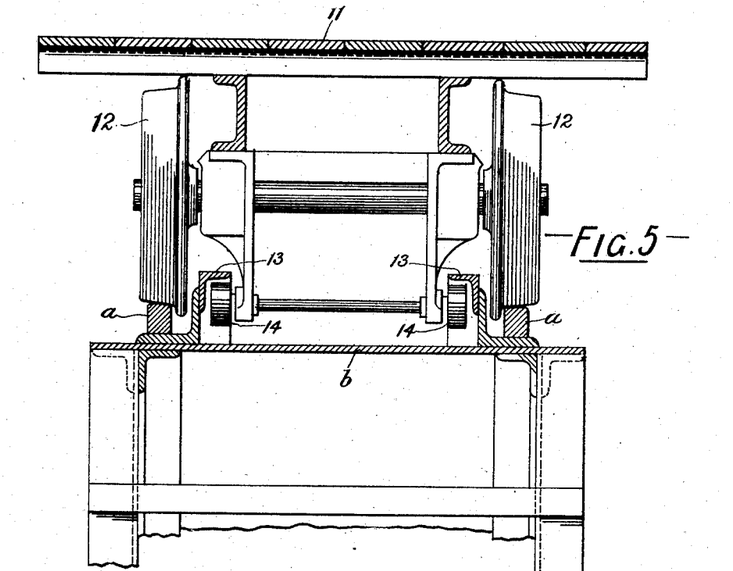
Fig. 5 shows the front of a car with guard rail arrangement for keeping the same on the track.

Referring to Fig. 5, 11 is a car provided with wheels 12 which run on a track $a$ carried by a wheel $b$. 13 are guard rails overhanging rollers 14 carried by a frame pendent from the car body.

Figure 6:
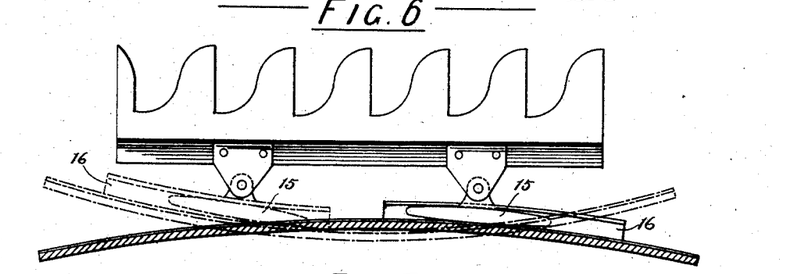
Fig. 6 shows in side elevation a car with sliders instead of wheels.
Figure 7:
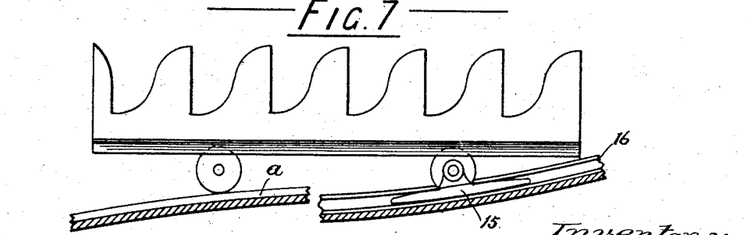
Fig. 7 shows a wheeled car with a slider employed as a retaining device.
Figure 8:
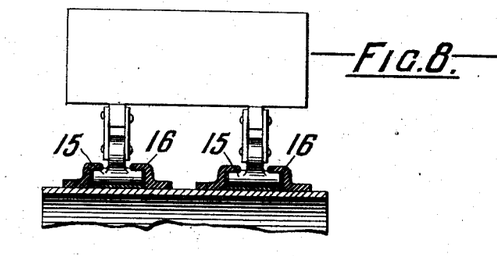
Fig. 8 is a front view of Fig. 6.
Figure 9:
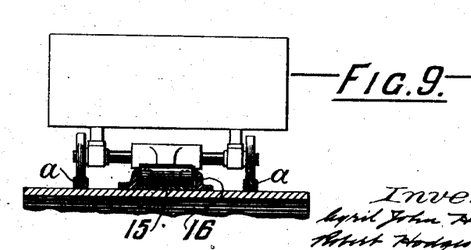
Fig. 9 is a front view of Fig. 7.

Instead of wheels 12 the car may have runners or sliders 15 (see Figs. 6 and 8) engaging in channels 16 formed by overhanging angle irons, or sliders may be used in conjunction with rollers or wheels as in Figs. 7 and 9.

It will be observed that the sliders are pivoted to the car so as to be able to follow the curves or undulations of the track.

Figure 10:
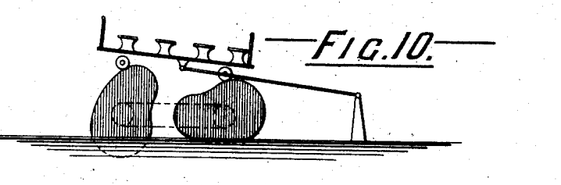
Fig. 10 shows how a car may be mounted on two tracks carried by separate wheels.

In Fig. 10 is indicated an arrangement wherein the track consists of two portions carried by separate cam-like wheels. The front runners of the car rest on one wheel while the back runners rest on the other.

Figure 11:
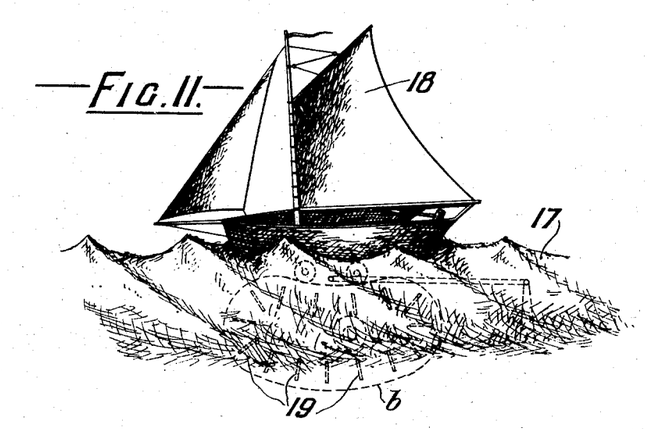
Fig. 11 shows a ship mounted on a wheel rotating in a trough of water.

In Fig. 11 is shown an imitation of a ship at sea. 17 is water contained in a tank, $b$ is a track wheel rotating therein. 18 is a ship provided with rollers resting on the track and 19 are blades or paddles on the track wheel which keep the water in agitation to represent waves when the wheel $b$ rotates.

Figure 13:
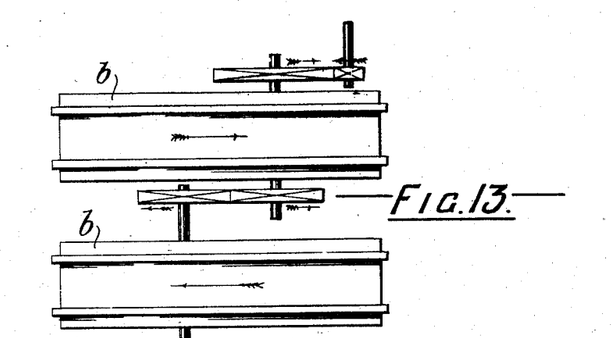
Figs. 13, 14 and 15 show three plans for rotating the wheels when used together in pairs.
Figure 14:
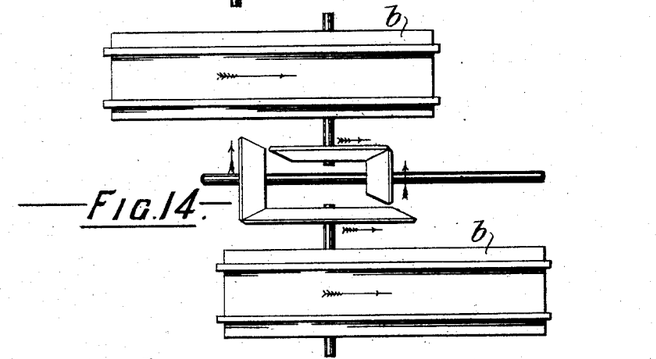
Figure 15:
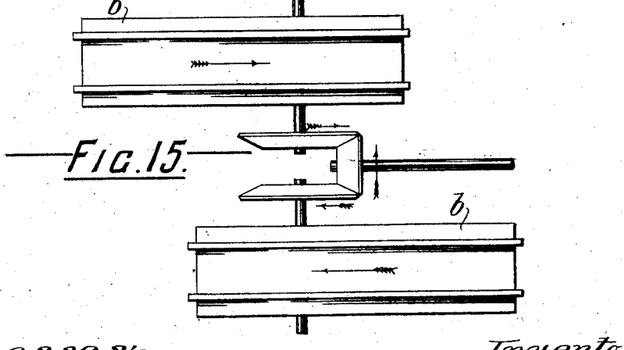

When two cars are to be used abreast and a pair of track wheels are placed side by side these wheels may either be driven in the same direction or in opposite directions. This can be readily managed by the use of appropriate gearing. For instance, in Fig. 13 an arrangement is shown diagrammatically which drives the wheels $b$, $b$, in opposite directions. By means of the gearing shown in Fig. 14 both wheels $b$ are driven in the same direction. In Fig. 15 the gearing is arranged to drive the wheels $b$ in opposite directions.

Figure 12:
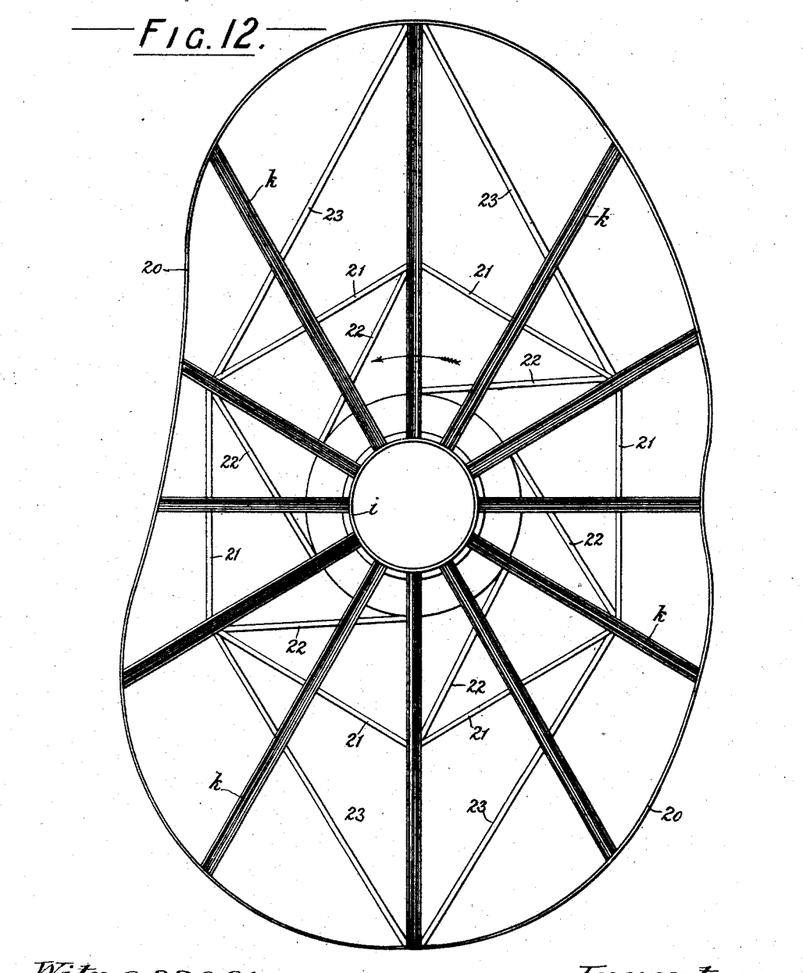
Fig. 12 shows an arrangement of braces and ties used in constructing an externally undulating wheel.

For building up the wheels it is preferred to follow the design illustrated in Fig. 12. 20 is a rim of appropriate contour carrying the track, this rim is supported on spokes $k$ extending radially from the drum $i$. The spokes are braced together by the six sided frame 21. 22 are stays attaching the spokes $k$ tangentially to the drum $l$ and 23 are stays for stiffening the wheel in the direction of its length.

To produce the illusion of fast traveling it is desirable to run alongside the car in a direction opposite to that which the car is supposed to be progressing a representation of a hedge fence or other scenic effect.

Figure 16:
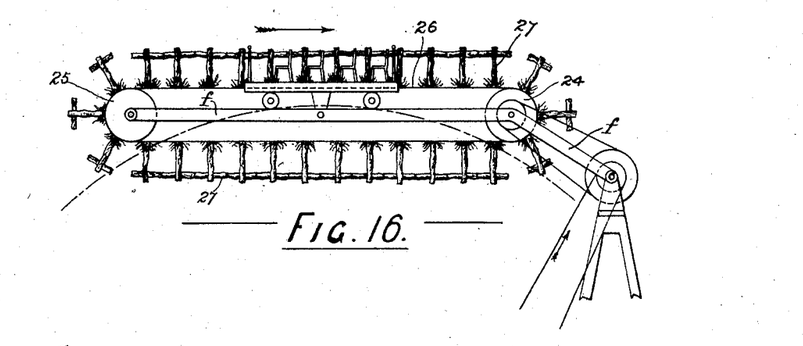
Fig. 16 represents a method of mounting and operating a device for producing a scenic effect.

In Fig. 16 we have shown a method whereby the above illusion may be obtained. 24, 25 are two pulleys carried by extensions of the bars $f$, of the car. Upon these pulleys is an endless band 26 or its equivalent which is run at a rapid speed by any convenient connections with the main driving gear. To the band 26 are connected uprights 27 which in the present instance are supposed to represent the bars of a fence which being run quickly past the car will give to the occupants an impression that they are running forward as well as moving up and down.

It is obvious that the uprights may be made to carry any desired scene depicted on fan-like sections attached thereto.

The advantages of an apparatus of the kind above described for the purposes of amusement over the usual gravity railway or toboggan slide are obvious. The construction is cheaper and the space occupied is less. The wheel can be kept going for any length of time and the car can be filled and emptied at regular intervals by the clock, the wheel being brought to a stand still at any desired point of its rotation so that the car may be always in a position convenient for the passengers to enter or leave the same.

In an ordinary gravity railway the journey occupies but a few moments and the car has to be returned empty or transferred to the beginning of a reversely arranged return track. In this way much valuable time is lost, a serious matter in crowded holiday resorts where the earnings of the apparatus depend upon its carrying capacity per hour in a short season.

What I claim, and desire to secure by Letters Patent of the United States is:—

1. A switchback apparatus comprising a wheel of cam-like contour, a track on the periphery of the wheel, a vehicle resting on the track, means for anchoring the vehicle, means for rotating the wheel so that rising, dipping, and similar movements is imparted to the vehicle substantially as set forth.

2. In a switch-back apparatus comprising a wheel of cam-like contour, a track on the periphery of the wheel and a vehicle anchored on the track, a free wheel clutch for driving the wheel substantially as set forth.

3. In a switch-back apparatus comprising a wheel of cam-like contour, a track on the periphery of the wheel and a vehicle anchored on the track, means for driving such wheel consisting of alternative trains of gearing, a clutch for engaging the one and a lever and a pinion carried on the end thereof for operating the other, substantially as described.

4. In a switch-back apparatus comprising a wheel of cam-like contour, a track on the periphery of the wheel, a vehicle on the track and means for anchoring the same, a scenic device, means for attaching the same to the anchoring means, and means for traveling the same quickly past the vehicle in order to impart an illusion of traveling to the occupants substantially as set forth.

5. In a switch-back apparatus comprising a wheel of cam-like contour, a track on the periphery of the wheel, a vehicle on the track and means for anchoring the same, the scenic device described consisting of pulley wheels carried by the anchoring means, a band running thereon and scenery supports carried by the band substantially as set forth.

6. The switch-back apparatus comprising a pair of wheels of cam-like contour, means for supporting said wheels with their long diameters transverse to each other, means for rotating said wheels, tracks on the periphery of the wheels, vehicles resting on said tracks, bars for anchoring the vehicles while the wheels rotate, a scenic device arranged between the said wheels and means for supporting it on the said anchoring bars and means for imparting traveling motion to the scene substantially as described.

In testimony whereof we have signed our names to this specification in the presence of two subscribing witnesses.

CYRIL JOHN HARTLEY.
ROBERT HODGES BISHOP.

Witnesses:
WILLIAM HENRY GRONESE,
ALFRED SAMUEL BISHOP.